United States Patent [19]

Spicer et al.

[11] 3,878,222

[45] Apr. 15, 1975

[54] METHODS OF PREPARING SUBSTITUTED IMIDAZOTHIAZOLIUM COMPOUNDS

[75] Inventors: Larry Dean Spicer, Princeton; John James Hand, Trenton, both of N.J.

[73] Assignee: American Cyanamid Company, Stamford, Conn.

[22] Filed: Nov. 22, 1972

[21] Appl. No.: 308,919

Related U.S. Application Data

[60] Division of Ser. No. 234,323, March 13, 1972, Pat. No. 3,792,166, which is a continuation-in-part of Ser. No. 90,141, Nov. 16, 1970, Pat. No. 3,708,490, which is a continuation-in-part of Ser. No. 3,220, Jan. 15, 1970, abandoned.

[52] U.S. Cl............................................ 260/306.8 F
[51] Int. Cl............................................. C07d 99/10
[58] Field of Search............................. 260/306.8 F

[56] References Cited
UNITED STATES PATENTS

| | | | |
|---|---|---|---|
| 3,274,209 | 9/1966 | Ragymackers et al........... | 260/306.7 |
| 3,708,490 | 1/1973 | Spicer et al.................. | 260/306.8 F |

*Primary Examiner*—Richard J. Gallagher
*Attorney, Agent, or Firm*—Ernest Y. Miller

[57] ABSTRACT

The preparation of acyl substituted phenylimidazo[2,1-b]thiazoles is described. They are prepared by acylation of phenylimidazo[2,1-b]thiazoles with an acyl halide or anhydride. They can also be prepared by cyclization of the appropriate substituted thiazole to produce the desired phenylimidazo[2,1-b]thiazoles. The latter compounds are useful for the control of helminths in warm-blooded animals.

7 Claims, No Drawings

METHODS OF PREPARING SUBSTITUTED IMIDAZOTHIAZOLIUM COMPOUNDS

This application is a division of application Ser. No. 234,323, filed Mar. 13, 1972 now U.S. Pat. 3,792,166, which is a continuation-in-part of application Ser. No. 90,141, filed Nov. 16, 1970 now U.S. Pat. 3,708,490, which is a continuation-in-part of application Ser. No. 3,220, filed Jan. 15, 1970, now abandoned.

DESCRIPTION OF THE INVENTION

The present invention relates to methods of preparing compounds of the fomula:

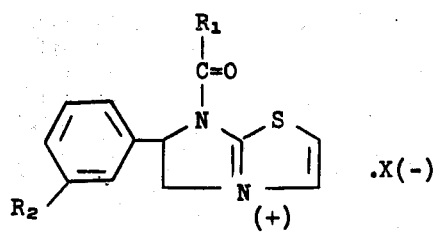

where $R_1$ is hydrogen, alkyl having 1 to 17 carbon atoms, haloalkyl having 1 to 6 carbon atoms, lower alkoxy having 1 to 4 carbon atoms, lower carboalkoxy loweralkyl, phenyl, halophenyl and lower alkylphenyl in which lower alkyl has 1 to 4 carbon atoms; $R_2$ is hydrogen, nitro, halo, trifluoromethyl, formylamino or lower alkanoyl ($C_1$-$C_4$) amino and X is a pharmaceutically acceptable anion and the optically active isomers thereof.

This invention relates to a novel process for the preparation of the above compounds and to the use of such compounds for the control of helminths in warm-blooded animals.

Synthesis of 7-carboxyacyl-6-phenyl-6,7-dihydro-5H-imidazo[2,1-b]thiazolium (I) salts having the formula:

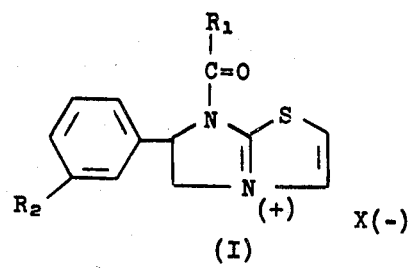

where $R_1$ is hydrogen, alkyl ($C_1$-$C_{17}$), haloalkyl ($C_1$-$C_6$), loweralkoxy ($C_1$-$C_4$), lower carbalkoxyloweralkyl, phenyl, halophenyl (preferably chlorophenyl or bromophenyl) or lower alkylphenyl (preferably methyl or ethyl phenyl); $R_2$ is hydrogen, nitro, halogen (preferably chloro or bromo), trifluoromethyl, formylamino or lower alkanoyl ($C_1$-$C_4$) amino and X is a pharmaceutically acceptable anion (preferably chlorine or bromine); can be prepared by the process illustrated below.

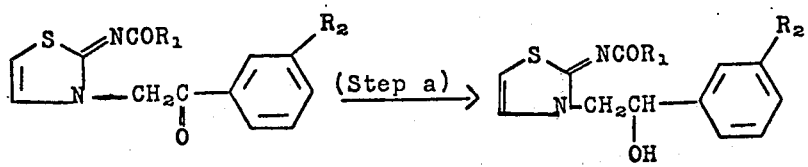

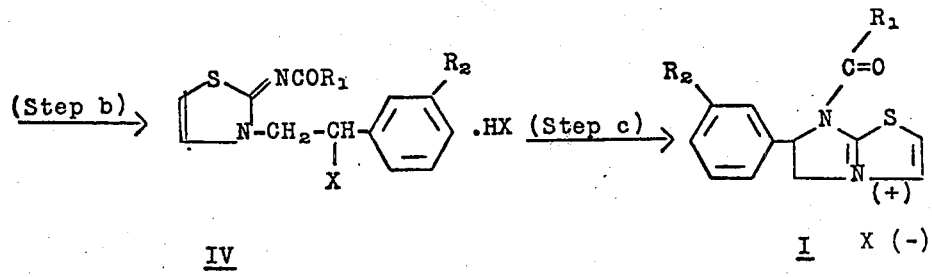

wherein $R_1$, $R_2$ and X are as hereinbefore defined.

With respect to the above process, it should be noted that compounds of Type (II) (i.e., the starting materials) are disclosed by B. Kickhofen and Frohnke, in Ber., 88, 1109 (1955) and A. H. M. Raeymaekers, F. T. N. Allenijn, J. Vanderberk et al. J. Med. Chem., 9, 545 (1966) and are generally prepared by the following reaction sequence.

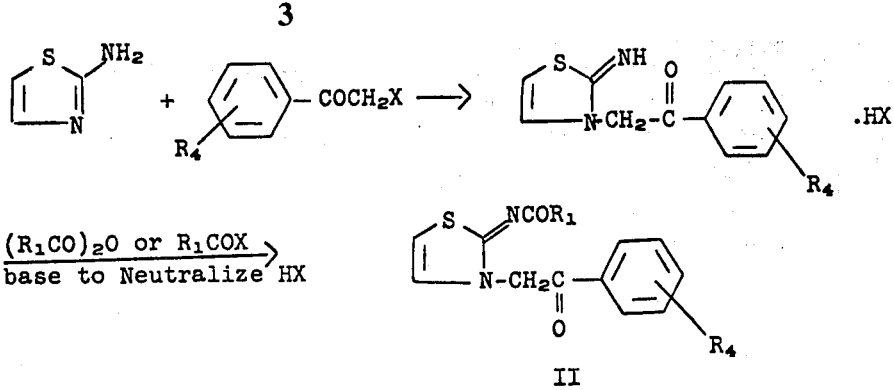

In the cited references X is halogen, preferably chlorine or bromine; $R_4$ is alkyl, nitro, halogen or the like and $R_1$ is methyl.

We have now found that $R_1$ may also be hydrogen, alkyl, haloalkyl, lower alkoxy, halophenyl, phenyl or lower alkylphenyl.

The reduction of the aryl ketone (II) to the alcohol (III) (Step a) has also been reported by Raeynaekers et al. for a variety of compounds. Raeymaekers utilizes $NaBH_4$ (sodium borohydride) as the reducing agent, however, we have found that lithium borohydride and potassium borohydride may also be used.

Step b of the present process is carried out by methods similar to those disclosed by Raeymaekers et al. and yields key intermediate compounds IV. Step b wherein $R_1$, $R_2$ and X are as hereinbefore defined. Ring closure of formula (IV) compounds to yield formula (I) compounds in which $R_1$ and $R_2$ are as described above may be accomplished by: (1) treatment of formula (IV) compounds with the appropriate anhydride at a temperature of about between 50–200°C., and preferably 90°–120°C. (2) isomerization of the free base of (IV) in an inert solvent (e.g., tetrahydrofuran or chloroform). The free base is made by neutralization of the HX salt (e.g., basic ion exchange resin, sodium bicarbonate or carbonate solution, or one mole of a trialkylamine). Isomerization is usually carried out at a temperature between 30°C. and 100°C. but somewhat higher or lower temperatures may be used;

Among the compounds prepared by the process of

Step b

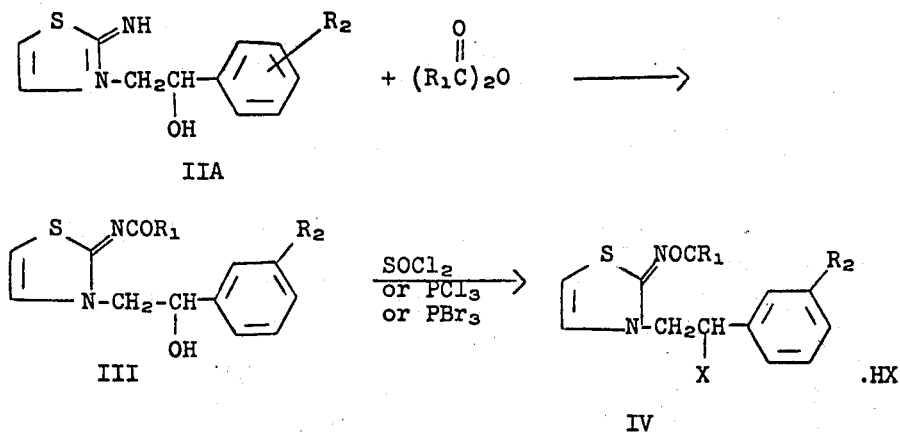

We have found in agreement with Raeymaekers et al. that by the reaction of formula (III) compounds with thionyl chloride ($SOCl_2$), phosphorus trichloride or phosphorus tribromide, in an inert solvent, formula (IV) compounds may be obtained. Step c the present invention are, for example; 7-acetyl-6-(m-chlorophenyl)-6,7-dihydro-5H-imidazo[2,1-b]thiazolium chloride; 7-acetyl-6,7-dihydro-6-(m-trifluoromethylphenyl)-5H-imidazo[2,1-b]thiazolium chloride; 7-acetyl-6-(m-formamidophenyl)-6,7-

Step c

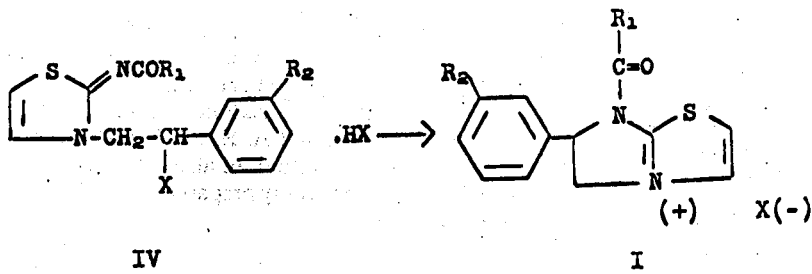

dihydro-5H-imidazo-[2,1-b]thiazolium chloride; 6-(m-acetamidophenyl)-7-acetyl-6,7-dihydro-5H-imidazo[2,1-b]thiazolium chloride; 7-acetyl-6-(m-bromophenyl)-6,7-dihydro-5H-imidazo[2,1-b]thiazolium chloride; 7-(4-chlorobutyryl)-6,7-dihydro-6-phenyl-5H-imidazo[2,1-b]-thiazolium chlorides; 7-(m-chlorobenzoyl)-6,7-dihydro-6-phenyl-5H-imidazo[2,1-b]thiazolium chloride; 6,7-dihydro-7-(p-nitrobenzoyl)-6-phenyl-5H-imidazo[2,1-b]thiazolium chloride; 6,7-dihydro-6-phenyl-7-(p-toluoyl)-5H-imidazo[2,1-b]thiazolium chloride; 7-formyl-6,7-dihydro-6-phenyl-5H-imidazo[2,1-b]thiazolium chloride.

In addition to the above compounds and the processes for the preparation thereof, this application also describes the use of such compounds for the treatment of helmenthiasis in warmblooded animals. For such use the compounds are generally dispersed in a pharmaceutically acceptable carrier or diluent and administered as a formulated composition. The compositions used may be in the form of a liquid drench, a bolus, capsule, pill, resinate formulation or dissolved in a liquid carrier for administration as an injectable. Boluses, tablets, pills, and the like may be prepared by admixing the active imidazo[2,1-b]-thiazolium salt with binders and lubricants and compressing the mixtures into the desired forms. Usually such preparations contain from about 5 to 20 percent by weight of the active ingredient. However, this may be varied to allow for variation in size, weight and species being treated. A typical bolus prepared with a compound of the present invention contains approximately 10% by weight of the active ingredient and 90% by weight of diluents such as for example, starch, dicalcium phosphate, cellulose, lactose and dextrose.

Advantageously, injectable formulations may be prepared by dissolving the active ingredient in distilled water, pharmaceutically acceptable alcohols, glycols or the like. Since the compounds of the invention are water soluble, they may be stored as the dry salt and dissolved in water just prior to injection. Stability problems are generally avoided by this practice and shipping costs are measurably reduced.

Where it is desirable to administer the present compounds in admixture with animal feed, we have found that such compounds are generally more acceptable when prepared as resinates utilizing acidic cationic exchange resins and carboxylated cation exchange resins either in hydrogen or alkali metal form. Resins such as the sulfonated polystyrenes prepared from styrene and having 1 to 20 percent by weight of divinyl benzene which functions as a cross-linking agent are among the preferred resins. These include amberlite resins IR-120, IR-112 and DOWEX$^{(R)}$ 50 and 50W.

In practice it is found that the compounds of the invention are effective for controlling a broadspectrum of helminths including Nematodirus, Hoemonchus, Trichostrongylus, Olsophagostomum, Trichuris and Ascaris, which infest animals such as cattle, swine, sheep, dogs, goats, rabbits, guinea pigs and the like.

Usually, effective control is obtained when the compounds are administered at from about 5 to 35 mg./kg. of animal body weight, but higher or lower dose levels may be used as dictated by the size, weight and species of the animal being treated. For example, dose levels as low as 3 mg./kg. of body weight or as high as 100 mg./kg. of body weight may be used depending upon the animal or animals under treatment. This may result in a dosage unit of from about 0.5 mg. to 500 mg.

DETAILED DESCRIPTION

The following examples describe the preparation of representative compounds of this invention and the results obtained in various tests as anthelmintics.

EXAMPLE 1

Preparation of
N-(3-Phenacyl-4-thiazol-2-ylidene)acetamide

The above compound is prepared according to the procedure described by Kickhofen et al. in 78% yield, melting point 148°–152°C. Utilizing the appropriate anhydride and phenyl thiazole provides formula (II) compounds referred to in the specification above in which $R_1$ and $R_2$ are as described.

EXAMPLE 2

Preparation of
N-[3-($\beta$-Hydroxyphenethyl)-4-thiazolin-2-ylidene]-acetamide (Process A, step a)

The above compound is prepared by reacting the compound of Example 1 with sodium borohydride by a slight modification of the procedure of Raeymaekers referred to about in 97% yield, melting point 156°–158°C., [lit. melting point 157°–159°.]

EXAMPLE 3

Preparation of
N-[3-($\beta$-Chlorophenethyl)-4-thiazolin-2-ylidene]hydrochloride acetamide (Process A, step b To a stirred slurry of 26.23 g. (0.10 mole) of the compound of Example 2, N-[3-($\beta$-hydroxyphenethyl)-4-thiazolin-2-ylidene] acetamide, in 300 ml. of methylene chloride is added 7.6 ml. (12.47 g.; 0.105 mole) of thionyl chloride dropwise. The addition is attended by a mild exothermic reaction. The reaction mixture is stirred at room temperature for 1 hour and then at reflux of one hour. The reaction mixture is then cooled and the solid collected by filtration, wt. 25.2 g. (79.5%), melting point 162°–165°C., dec. One recrystallization of a 5.0 g. sample gives 2.75 g. of analytically pure product, melting point 164°–166°C., dec.

Anal. Calcd. for $C_{13}H_{14}N_2SOCl_2$: C, 49.21; H, 4.45; N, 8.3; S, 10.11; Cl, 22.35.

Found C, 49.25; H, 4.51; N, 8.63; S, 10.38; Cl, 22.12.

EXAMPLE 4

Preparation of
7-Acetyl-6,7-dihydro-6-phenyl-5H-imidazo[2,1-b]-thiazolium chloride chlorde (Process A, step c)

A mixture of 10.0 g. (31.6 mmoles) of the compound of Example 3 and 80 ml. of acetic anhydride is warmed slowly to reflux. Solution is attained ca. 90°C. After refluxing for 2 hours, the solvent is evaporated under reduced pressure. Residual solvent is removed by co-distillation with toluene. The residue is warmed with acetone, cooled and the product collected by filtration. This gives 6.92 g. of white crystals, melting point 196°–201°C. A second crop of 0.5 g. is obtained, melting point 196°–200°C. The mull infrared spectrum of Pat. No. 4,714,503 the product obtained by this procedure is different from the product obtained by present Method . However, the NMR is consistent with the expected product and differs only in the water protons when compared with the NMR spectrum obtained in present method.

EXAMPLE 5

Preparation of
7-Acetyl-6,7-dihydro-6-phenyl-5-H-imidazo[2,1-b]thiazolium perchlorate (Process A, step c)

To a slurry of 1.58 (5 mmoles) of the compound of Example 3, in 50 ml. of chloroform there is added 0.51 g. (5.04 mmoles) of triethylamine in 10 ml. of chloroform. The reaction mixture immediately becomes homogeneous. After refluxing for 2 hours, the reaction mixture is cooled and the solvent evaporated to a gum. Acetone is added and the solid removed by filtration. The white solid, 1.22 g., appears to be mixture of ring closed product and triethyl amine hydrochloride. It is dissolved in water, treated with aqueous sodium filtration, and the precipitate collected by filtrating washed with water and dried. This gives 0.63 g. (2.08 mmoles) 41.5%, melting point 177°–179°C., of product. The infrared spectrum is identical to that of the authentic perchlorate salt.

EXAMPLE 6

Preparation of
7-Acetyl-6,7-dihydro-6-phenyl-5H-imidazo[2,1-b]thiazolium chloride (Process A, step c)

To a stirred slurry of 1.58 g. (5.0 mmoles) of the chloro hydrochloride of Example 3 in 50 ml. of chloroform, there is added without drying 5.0 g. of Amberlyst A-21. $RCH_2N(CH_3)_2$; 4.7–5.0 meq/g. of dry weight. Porosity 20–30% Surface Area 20–30 meter/g. Moisture, 45%). After stirring for 15 minutes all of the compound is in solution. The resin is filtered off and washed with chloroform. The filtrate is refluxed for two hours, cooled and the solvent evaporated to a gum. This is warmed with acetone and the oily mixture slowly crystallizes. The solid is filtered off, washed and dried to give 0.77 g. (51.6%), melting point 95°–100°C. of the chloride salt.

When the ion exchange resin is washed and dried to remove water and the reaction carried out at reflux in the presence of the resin, the yield of product is 41%.

EXAMPLE 7

Following the procedures as described in Examples 8 and 9, but substituting the starting materials with the following compounds:
A. N-[3-(β-chlorophenethyl)-4-thiazolin-2-ylidene]formamide, hydrochloride.
B. N-[3-(β-chlorophenethyl)-4-thiazolin-2-ylidene]4-chlorobutyramide, hydrochloride
C. N-[3-(β-chlorophenethyl)-4-thiazolin-2-ylidene]m-chlorobenzamide, hydrochloride.
D. p-nitrobenzamide, N-[3-(β-chlorophenethyl)-4-thiazolin-2-ylidene], hydrochloride
E. p-tolylamide, N-[β-chlorophenethyl)-4-thiazolin-2-ylidene], hydrochloride
the following products are obtained:

A'. 7-formyl-6,7-dihydro-6-phenyl-5H-imidazo[2,1-b]thiazolium chloride
B'. 7-(chlorobutyryl)-6,7-dihydro-6-phenyl-5H-imidazo[2,1-b]thiazolium chloride
C. 7-(m-chlorobenzoyl)-6,7-dihydro-6-phenyl-5H-imidazo[2,1-b thiazolium chloride
D'. 7-(p-nitrobenzoyl)-6,7-dihydro-6-phenyl-5H-imidazo[2,1-b]thiazolium chloride
E'. 7-(p-toluoyl)-6,7-dihydro-6-phenyl-5H-imidazo[2,1-b]thiazolium chloride

EXAMPLE 8

Preparation of
7-Acetyl-6,7-dihydro-6-phenyl-5H-imidazo[2,1-b]thiazolium chloride (Process A, Step c)

12.5 Grams (40.0 mmol.) of N-[3-(β-chlorophenethyl)4-thiazolin-2-ylidene]hydrochloride acetamide is partitioned between 50 ml. of water and 100 ml. methylene chloride and then saturated aqueous sodium bicarbonate is added until the aqueous phase showed a pH of near 7.0. The methylene chloride is dried over magnesium sulfate and the removal of the solvent yields an oil (free base of starting material). The oil is heated at reflux temperature for 30 minutes in 10 ml. of methyl isopropyl ketone (boiling point 95°C.). On cooling, a solid formed in a reaction and 100 ml. of the acetone along with 10 drops of water is added to the reaction. The product is then filtered and dried to yield 8.0 g. (70% yield). The 7-acetyl derivative is isolated as the monohydrate. The NMR and IR are consistent with the product shown above.

Other 7-acyl compounds are prepared by essentially the same procedure. The 7-acyl compounds are formed when the unring closed compound in its free base form is heated in an inert solvent. The larger acyl groups require higher temperatures so that it is advantageous to employ a solvent like toluene or xylene when the acyl group is isobutryl and to carry out the reaction at the reflux temperature of the solvent.

EXAMPLE 9

Tests Showing Activity of Present Compounds Against Infection with *Nematospiroides dubius*

In the following tests Swiss-Webster female white mice are infected with *Nematospiroides dubius* and held for 3 weeks to permit the infestations to mature.

After the holding period, mice are randomly selected and inoculated subcutaneously with an aqueous solution of test compound. Distilled water is used as the diluent for said solution. sufficient compound is dissolved to permit injection of from 15 to 60 mg./kg. of body weight of test compound.

Four to five days after treatment the mice are necropsied and the number of adult worms counted and recorded. Twenty untreated mice are used as controls and these have 20 to 25 adult worms. Data obtained are reported in Table I below as percent reduction of adult worms.

TABLE I

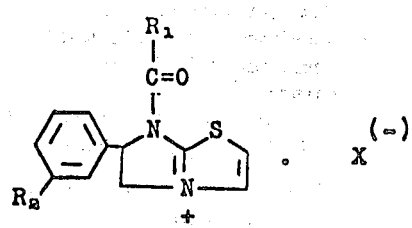

| $R_1$ | $R_2$ | $X$ | No. of Mice | Dose Mg./Kg. | Subcutaneous Activity vs. N dubius % Reduction of Adult Worms |
|---|---|---|---|---|---|
| $CH_3$ | H | Cl | 23 | 60 | 89 |
|  |  |  | 20 | 40 | 67 |
|  |  |  | 29 | 30 | 56 |
| $ClCH_2$ | H | Cl | 4 | 60 | 99 |
|  |  |  | 8 | 30 | 42 |
| $(CH_3)_3-C-$ | H | Cl | 8 | 60 | 94 |
|  |  |  | 8 | 30 | 75 |
|  |  |  | 4 | 15 | 34 |
| $C_6H_5$ | H | Cl | 4 | 60 | 95 |
| $C_6H_{11}$ | H | Cl | 4 | 30 | 23 |
|  |  |  | 4 | 60 | 53 |
|  |  |  | 4 | 30 | 29 |
| $CH_3(CH_2)_4-$ | H | Cl | 4 | 60 (50% DMSO) | 94 |
|  |  |  | 4 | 30 (50%DMSO) | 70 |
| $CH_3OCOCH_2CH_2-$ | H | Cl | 4 | 60 | 94 |
|  |  |  | 4 | 30 | 39 |
| $CH_3$ | $NO_2-$ $C_6H_5$ | Cl | 4 | 60 | 100 |
|  |  |  | 4 | 30 | 24 |

All compounds tested without adjustment for salt. All dissolved in sterile water.
DMSO = Dimethylsulfoxide.

EXAMPLE 10

Test of present compounds in sheep

Animals

Western lambs are inoculated with Clostridum Type D bacterin and treated with an anthelmintic (8-10 mg./kg., 1-tetramisol, 1-TMS) to remove existing worm burdens.

One month later, they are infected with 1200 *Ostertagia circumcinta* (originally obtained from the University of California, Davis, California), 11000 *Trichostrangylus axei* (obtained originally from the University of Kentucky); and 95000 *Trichostrongylus colubriformis*. All three species have been maintained in our laboratory for several years. Animals are inoculated by intrarumenal injection. They are fed a commercial pelleted sheep ration plus hay and kept on concrete.

Material

Compounds given by intrarumenal injection are dissolved in 30 cc's water and injected with a 30 cc disposable syringe using a 17 or 18 ga. 2 inch needle.

Compounds given subcutaneously are prepared by dissolving a weighed amount of material in distilled water and adjusting the volume to give either 5, 10 or 20% solutions.

Solutions are injected in the shoulder area. All animals are sacrificed 3 or 4 days after treatement. Both abdnasum and small intestines are removed, examined and processed by routine technique for counting worms.

Untreated controls are sacrificed at the same time and efficacy is determined by the following formula:

% Efficacy = Avg. No. of Worms in controls - No. remaining at Necropsy/Avg. No. in controls Data obtained are give in Table II below:

TABLE II

| Compound | Dose Mg./Kg. | Route | No. of Sheep | H | T.a. | Oc. | Tc |
|---|---|---|---|---|---|---|---|
| 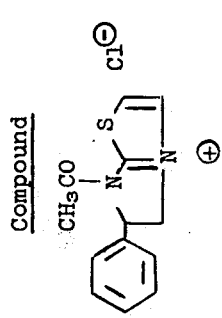 | 6 | S.C. | 2 | 99 | 75 | 79 | 94 |
|  | 8 | S.C. | 4 | 100 | 95 | 90 | 99 |
|  | 8 | I.R. | 2 | 98 | 30 | 48 | 29 |
|  | 10 | S.C. | 2 | 100 | 93 | 98 | 99 |
| 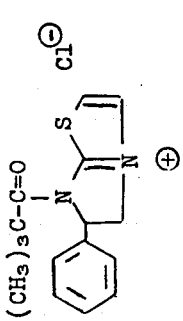 | 8 | S.C. | 2 | 100 | 80 | 97 | 98 |

H = *Haemonchus contortus*
T.A. = *I axel*
OC. = *Ostertagia circumcincta*
Tc = *T. colubriformis*
S.C. = Subcutaneous
I.R. = Intrarumenal
1-TMS = 1-tetramisole

EXAMPLE 11

In calves, the injection site studies with 7-acetyl5,6-dihydro-6-phenyl-5H-imidazo[2,1-b]thiazolium chloride is administered subcutaneously to two calves using a commercial injectable 1-TMS (1tetramisole) formulation as the control. A total of 10 sites are used on each calf, five on one side received either 8 or 16 mg./kg. (18.2 or 36.4% solutions) dissolved in water of the test compound, and five sites on the opposite side receive 8 mg./kg. of 1-TMS (7.5% solution). Slight tissue reactions are visible when examined at necropsy 26 to 30 days after injecting at one of five and two of five sites in the calves with the test compound and two of five and three of five with the 1-tetramisole injectable.

The reactions which occurred are of such mild nature they might easily have been overlooked. Two of the three reactions with the test compound and two of the five 1-tetramisole reactions occurred in the rump. The tightness of the hide at this location made subcutaneous injection more difficult compared to the other sites and the needle may have scratched or penetrated the muscle since some blanching is visible on slicing into the muscle. Of the three reactions with the test compound, two occurr with the concentrated solution (36.4%) at 16 mg./kg. and one with the lesser concentration (18.2% at 8 mg./kg.

We claim:

1. A method for the preparation of compounds of the formula:

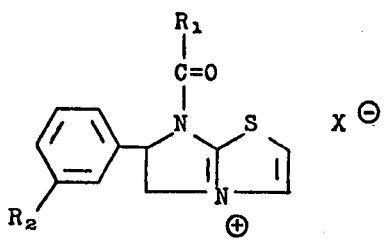

where $R_1$ is hydrogen, alkyl ($C_1$ to $C_{17}$), lower alkoxy ($C_1$ to $C_4$), lower carboalkoxy lower alkyl, phenyl, halophenyl, or loweralkylphenyl; $R_2$ is hydrogen, nitro, halogen, trifluoromethyl, formylamino or alkanoyl ($C_1$-$C_4$) amino and X is a pharmaceutically acceptable anion; comprising treating a compound of the formula:

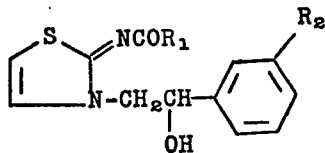

where $R_1$ and $R_2$ are as described above, with at least one mole equivalent of a compound selected from the group consisting of thionyl chloride, phosphorus trichloride and phosphorus tribromide to form a compound of the formula:

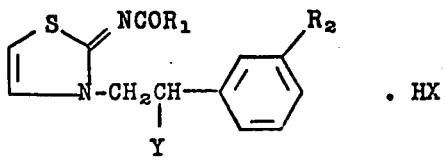

wherein $R_1$, $R_2$ are as described above and Y is chlorine or bromine; and treating the thus formed compound with (1) acetic anhydride in an inert organic solvent at a temperature between 50°C. and 200°C. to produce the ring closed compound; or (2) by neutralization of the thus formed acid salt with a basic ion exchange resin, aqueous sodium bicarbonate or a lower trialkylamine ($C_3$-$C_{12}$) and heating of the thus formed free base in the presence of an inert solvent at a temperature of from about 30°C. to 100°C. to form the ring closed product.

2. A method according to claim 1, wherein $R_1$ is alkyl ($C_1$-$C_{17}$) and $R_2$ is lower alkyl phenyl.

3. A method according to claim 1, wherein $R_1$ is lower alkoxy ($C_1$-$C_4$) and $R_2$ is trifluoromethyl.

4. A method according to claim 1, wherein $R_1$ is halophenyl and $R_2$ is alkanoyl ($C_1$-$C_4$) amino.

5. A method according to claim 1, wherein $R_1$ is methyl and $R_2$ is hydrogen.

6. In a method according to claim 1, the step of heating 2,N-[3-($\beta$-hydroxyphenethyl)-4-triazoline-2-ylidene]acetamide with acetic anhydride at refluxing temperature and recovering 7-acetyl-6,7-dihydro-6-phenyl-5H-imidazo[2,1-b]thiazolium chloride.

7. A method according to claim 1, wherein a compound of the formula:

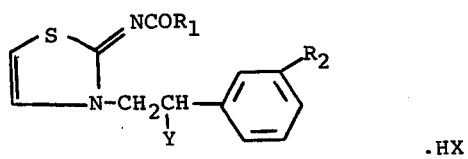

is neutralized with a basic ion exchange resin, aqueous sodium bicarbonate or a lower trialkylamine ($C_3$-$C_{12}$) and heating of the thus formed free base in the presence of an inert solvent at a temperature of from about 30°C. to 100°C. to form the ring closed product.

* * * * *